United States Patent
Mudalige et al.

(10) Patent No.: US 10,479,373 B2
(45) Date of Patent: Nov. 19, 2019

(54) DETERMINING DRIVER INTENTION AT TRAFFIC INTERSECTIONS FOR AUTOMOTIVE CRASH AVOIDANCE

(71) Applicant: GM GLOBAL TECHNOLOGY OPERATIONS LLC, Detroit, MI (US)

(72) Inventors: Upali P. Mudalige, Oakland Township, MI (US); Thanura Ranmal Elvitigala, Hershey, PA (US)

(73) Assignee: GM GLOBAL TECHNOLOGY OPERATIONS LLC, Detroit, MI (US)

(*) Notice: Subject to any disclaimer, the term of this patent is extended or adjusted under 35 U.S.C. 154(b) by 868 days.

(21) Appl. No.: 14/989,502

(22) Filed: Jan. 6, 2016

(65) Prior Publication Data
US 2017/0193384 A1    Jul. 6, 2017

(51) Int. Cl.
*G08G 1/16* (2006.01)
*B60W 30/08* (2012.01)
(Continued)

(52) U.S. Cl.
CPC ........ *B60W 50/0097* (2013.01); *B60W 30/08* (2013.01); *B60W 50/10* (2013.01); *G08G 1/161* (2013.01); *G08G 1/162* (2013.01); *G08G 1/164* (2013.01); *G08G 1/166* (2013.01); *B60W 2050/0001* (2013.01); *B60W 2540/18* (2013.01);
(Continued)

(58) Field of Classification Search
CPC .. B60W 30/08; B60W 40/10; B60W 50/0097; B60W 50/10; B60W 2050/0001; B60W 2540/20; B60W 2550/0068; B60W 50/14; G08G 1/162; G08G 1/164; G08G 1/166; G08G 1/161
See application file for complete search history.

(56) References Cited

U.S. PATENT DOCUMENTS 5,712,618 A * 1/1998 McKenna .............. B60Q 1/346
340/463
7,805,240 B2 * 9/2010 Naitou .................. G01C 21/12
340/438
(Continued)

FOREIGN PATENT DOCUMENTS

| CN | 102991504 A | 3/2013 |
|---|---|---|
| CN | 103295408 A | 9/2013 |
| JP | 2002190092 A * | 7/2002 |

OTHER PUBLICATIONS

Misener, Jim et al. "Cooperative Intersection Collision Avoidance System (CICAS): Signalized Left Turn Assist and Traffic Signal Adaptation" California Path Research Report, Apr. 2010, 252 pages.
(Continued)

Primary Examiner — Peter D Nolan
(74) Attorney, Agent, or Firm — Cantor Colburn LLP

(57) ABSTRACT

A system and method for determining whether a driver of a host vehicle intends to make a left or right turn with a certain level of confidence. The method obtains a plurality of turning cues that identify external parameters around the host vehicle and/or define operating conditions of the host vehicle, and determines a confidence level that the host vehicle will make a left or right turn based on the turning cues, where determining the confidence level includes weighting each of the cues based on current vehicle operating conditions.

18 Claims, 5 Drawing Sheets

(51) Int. Cl.
  *B60W 50/00* (2006.01)
  *B60W 50/10* (2012.01)
(52) U.S. Cl.
  CPC ..... *B60W 2540/20* (2013.01); *B60W 2550/22* (2013.01)

(56) References Cited

U.S. PATENT DOCUMENTS

| | | | | |
|---|---|---|---|---|
| 7,889,065 B2* | 2/2011 | Smith | ................ | B60Q 1/34 200/61.27 |
| 8,131,444 B2* | 3/2012 | Urban | ................ | B60W 40/04 340/903 |
| 8,618,952 B2* | 12/2013 | Mochizuki | ................ | G08G 1/161 340/435 |
| 9,141,909 B2* | 9/2015 | Hisano | ................ | B60W 40/06 |
| 9,701,241 B2* | 7/2017 | Raghu | ................ | H04N 5/2257 |
| 9,789,819 B2* | 10/2017 | Watanabe | ................ | B60R 1/00 |
| 9,978,273 B2* | 5/2018 | Heckmann | ................ | B60W 50/14 |
| 2007/0252725 A1* | 11/2007 | Nishida | ................ | G08G 1/096716 340/905 |
| 2008/0068146 A1* | 3/2008 | Cauldwell | ................ | B60Q 9/00 340/435 |
| 2008/0120025 A1* | 5/2008 | Naitou | ................ | G01C 21/12 701/33.7 |
| 2009/0174540 A1* | 7/2009 | Smith | ................ | B60Q 1/34 340/465 |
| 2009/0185718 A1* | 7/2009 | Moritz | ................ | B60Q 1/085 382/104 |
| 2009/0204304 A1* | 8/2009 | Urban | ................ | B60W 30/14 701/96 |
| 2010/0131148 A1* | 5/2010 | Camhi | ................ | B60W 40/09 701/31.4 |
| 2011/0238254 A1* | 9/2011 | Mulder | ................ | B60W 30/12 701/31.4 |
| 2012/0016581 A1* | 1/2012 | Mochizuki | ................ | G08G 1/161 701/301 |
| 2012/0188098 A1* | 7/2012 | Mochizuki | ................ | G08G 1/096783 340/905 |
| 2013/0191020 A1* | 7/2013 | Emani | ................ | G08G 1/096816 701/468 |
| 2013/0226454 A1* | 8/2013 | Hisano | ................ | G06N 5/02 701/533 |
| 2013/0281140 A1* | 10/2013 | Rubin | ................ | G08G 9/02 455/500 |
| 2015/0203033 A1* | 7/2015 | Watanabe | ................ | B60R 1/00 348/148 |
| 2015/0266473 A1* | 9/2015 | Hayasaka | ................ | B60W 30/09 701/70 |
| 2016/0185347 A1* | 6/2016 | Lefevre | ................ | B60W 30/09 701/301 |
| 2017/0016734 A1* | 1/2017 | Gupta | ................ | G01C 21/3697 |
| 2017/0072852 A1* | 3/2017 | Matsuoka | ................ | B60Q 9/008 |
| 2017/0076598 A1* | 3/2017 | Scofield | ................ | G08G 1/0112 |
| 2017/0080853 A1* | 3/2017 | Raghu | ................ | H04N 5/2257 |
| 2017/0148318 A1* | 5/2017 | Heckmann | ................ | B60W 50/14 |
| 2017/0197617 A1* | 7/2017 | Penilla | ................ | B60W 30/09 |
| 2018/0222475 A1* | 8/2018 | Andersson | ................ | B60W 30/095 |
| 2018/0225963 A1* | 8/2018 | Kobayashi | ................ | G08G 1/0965 |
| 2018/0239361 A1* | 8/2018 | Micks | ................ | B60W 40/08 |

OTHER PUBLICATIONS

Chinese First Office Action dated Oct. 8, 2018 cited in Application No. 201611227653.9, 16 pgs. (GMC0164CN) (no English language translation).

Jiao et al., "Probe Data-based Identification of Vehicle Behaviors at Intersection", Journal of Highway and Transportation Research and Development, vol. 29, No. 6, Jun. 2012, pp. 127-132.

* cited by examiner

DETERMINING DRIVER INTENTION AT TRAFFIC INTERSECTIONS FOR AUTOMOTIVE CRASH AVOIDANCE

BACKGROUND OF THE INVENTION

Field of the Invention

This invention relates generally to a system and method for determining whether a driver of a host vehicle intends to make a left or right turn and, more particularly, to a system and method for determining whether a driver of a host vehicle intends to make a left or right turn with a certain level of confidence using all available cues, such as the host vehicle travel lane.

Discussion of the Related Art

Object detection systems and collision avoidance systems are becoming increasingly common on modern vehicles. Object detection systems can provide a warning to a driver about an object in the path of a moving host vehicle. The warning can be a visual indication on the vehicles instrument panel or in a head-up display (HUD), and/or can be an audio warning such as chimes or other feedback device, such as haptic seat. Object detection systems can also provide input to active vehicle systems, such as adaptive cruise control systems, which control vehicle speed to maintain the appropriate longitudinal spacing to a leading vehicle, and rear cross traffic avoidance systems, which can provide both warnings and automatic braking to avoid a collision with an object behind the host vehicle when the host vehicle is backing up.

Active safety technology employing object detection systems is currently becoming a major area of research in the automotive industry. Advances in sensor and actuator technologies have enabled the development of driver assistance systems (DAS) to prevent road accidents, especially those caused by driver mistakes or inattention. Several types of DAS, such as anti-lock braking system (ABS), electronic stability control (ESC), adaptive cruise control (ACC), lane departure warning (LDW) system, lane change assist (LCA), forward collision alert (FCA), and lane keeping assist (LKA), are already in production vehicles. Collision imminent braking is an effective way of avoiding or mitigating a collision by applying the vehicle brakes. Collision avoidance systems may also provide steering commands that cause the host vehicle to follow a calculated steering path to provide the vehicle steering to avoid a collision when braking alone can only mitigate the collision.

The object detection sensors for these types of systems may use any of a number of technologies, such as short range radar, long range radar, cameras with image processing, laser or Lidar, ultrasound, etc. The object detection sensors detect vehicles and other objects in the path of a host vehicle. In many vehicles, the object detection sensors are integrated directly into the front bumper or other fascia of the vehicle, but other mounting locations are available.

Radar and lidar sensors that may be employed on vehicles to detect objects around the vehicle and provide a range to and orientation of those objects provide reflections from the objects as multiple scan points that combine as a point cloud (cluster) range map, where a separate scan point is typically provided for every ½° across the horizontal field-of-view of the sensor. These scan points also provide a reflectivity measure of the target surface in the form of intensity in addition to the range and azimuth angle values, and therefore, if a target vehicle or other object is detected in front of the host vehicle, there may be multiple scan points that are returned that identify the surface reflectivity, distance and azimuth angle of the target vehicle from the subject vehicle. By providing a cluster of scan return points, objects having various and arbitrary shapes, such as trucks, trailers, bicycle, pedestrian, guard rail, K-barrier, etc., can be more readily detected, where the bigger and/or closer the object to the host vehicle the more scan points are provided.

Cameras on a vehicle may provide back-up assistance, take images of the vehicle driver to determine driver drowsiness or attentiveness, provide images of the road as the vehicle is traveling for collision avoidance purposes, provide structure recognition, such as roadway signs, etc. Other vehicle vision applications include vehicle lane sensing systems to sense the vehicle travel lane and drive the vehicle in the lane-center. Many of these known lane sensing systems detect lane-markers on the road for various applications, such as lane departure warning (LDW), lane keeping (LK), lane centering (LC), etc., and have typically employed a single camera, either at the front or rear of the vehicle, to provide the images that are used to detect the lane-markers.

It is also known in the art to provide a surround-view camera system on a vehicle that includes a front camera, a rear camera and left and right side cameras, where the camera system generates a top-down view of the vehicle and surrounding areas using the images from the cameras, and where the images overlap each other at the corners of the vehicle. The top-down view can be displayed for the vehicle driver to see what is surrounding the vehicle for back-up, parking, etc. Future vehicles may not employ rearview mirrors, but may instead include digital images provided by the surround view cameras.

Various vehicle systems of the type being discussed herein require that the position and orientation of the vehicle be known. Currently, modern vehicles typically rely on a global navigation satellite system (GNSS), such as GPS, that provides signals to a vehicle display to identify vehicle location.

Vehicle-to-vehicle (V2V) and vehicle-to-infrastructure (V2I) communications systems, sometimes referred to generally as V2X systems, are known to those skilled in the art, and require a minimum of one entity to send information to another entity. For example, many vehicle-to-vehicle safety applications can be executed on one vehicle by simply receiving broadcast messages from a neighboring vehicle. These messages are not directed to any specific vehicle, but are meant to be shared with a vehicle population to support the particular application. In these types of applications where collision avoidance is desirable, as two or more vehicles talk to each other and a collision becomes probable, the vehicle systems can warn the vehicle drivers, or possibly take evasive action for the driver, such as applying the brakes. Likewise, traffic control units can observe the broadcast of information and generate statistics on traffic flow through a given intersection or roadway.

When roadways cross intersections are created. In order to prevent vehicles from colliding with each other at an intersection, some type of traffic control mechanism, such as stop signs, yield signs, traffic lights, etc., are generally provided so that perpendicularly or cross-traveling traffic can travel safely through the intersection. There are many intersections that may have approaches with no traffic controls, for example, an intersection between a major road and a smaller side road, where the major road has the right of away and the smaller road may have a stop sign. In addition to accidents caused by cross-traffic, accidents occur during turning maneuvers at intersections, where judgment errors may occur concerning opposite direction traffic when making left turns and left coming traffic when making right turns. Thus, intersections, especially high traffic intersections, are the cause of many vehicle collisions and traffic accidents.

Known object detection sensor systems that attempt to warn a driver of a potential collision when traveling along a roadway, and especially at an intersection, could benefit by knowing whether the driver of a host vehicle intends to make a turn. Combining accurate maps and vehicle positioning (e.g., GPS) with the object detection sensor systems could improve the accuracy of host vehicle intention detection. Although it is impossible to exactly know the intent of the driver, algorithms can be developed that identify a probability that the driver will be making a turn.

SUMMARY OF THE INVENTION

The present disclosure describes a system and method for determining whether a driver of a host vehicle intends to make a left or right turn with a certain level of confidence. The method obtains a plurality of turning cues that identify external parameters around the host vehicle and/or define operating conditions of the host vehicle, and determines a confidence level that the host vehicle will make a left or right turn based on the turning cues, where determining the confidence level includes weighting each of the cues based on current driver operating conditions.

Additional features of the present invention will become apparent from the following description and appended claims, taken in conjunction with the accompanying drawings.

DETAILED DESCRIPTION OF THE EMBODIMENTS

The following discussion of the embodiments of the invention directed to a system and method for determining whether a host vehicle intends to make a left or right turn with a certain level of confidence is merely exemplary in nature, and is in no way intended to limit the invention or its applications or uses.

As will be discussed in detail below, the present invention proposes a system and method for determining at a certain level of confidence whether the driver of a host vehicle intends to make a left or right turn based on all of the information (e.g., signals, clues) that is available, referred to herein as cues. Although the main application of the system and method is to determine driver turning intent at an intersection, the algorithms will always be monitoring the available cues to always be determining driver turning intent. For example, the algorithm combines data from onboard active and passive sensors, information from other vehicles, wireless signals, GPS, map databases, driver behavior, road surface conditions, weather, etc. to determine a confidence level that the driver intends to make a left or right turn at a particular point in time. The algorithm develops an approach to assess and quantify the driver's turning intention at an intersection or otherwise, and if available, uses geometric intersection data (GID) map from infrastructure servers, such as infrastructure-to-vehicle communications, Onstar™, internet cloud, etc., or provided through an on-board map database. As remote vehicles arrive at an intersection or travel near the host vehicle, the confidence level of whether the vehicle intends to make a left or right turn will be calculated considering host vehicle velocity, acceleration, path history of the host vehicle, relative position of the host vehicle and external objects, etc. The confidence level will be continuously updated while the host vehicle is within the intersection and approaching at some proximity to the intersection. The algorithm for computing the confidence level is adapted to facilitate changes and availability of data and the quality of the data sources, where the algorithms are self-learning by utilizing data from prior events. The determined confidence level is compared with one or more thresholds, and information, warnings, automatic braking, etc. may be provided if the confidence level exceeds any of the threshold. Other onboard applications may use the confidence level of a possible turn to take appropriate action, such as additional threat assessments and vehicle control actions relative to left and right turns, turning on a vehicle status, such as turn signals, communicating the host vehicle intention to other vehicles through V2V communications, etc.

Figure 1:
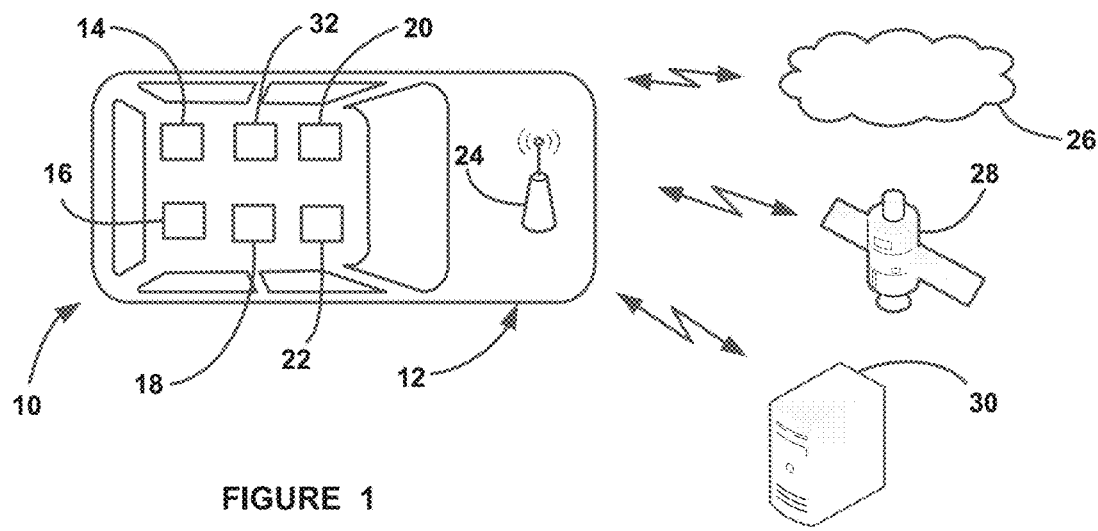
FIG. 1 is an illustration of a vehicle including various components for identifying operation of the vehicle and detecting objects around the vehicle.

FIG. 1 is a simple illustration of a vehicle system 10 that includes a vehicle 12 having a map database 14, a navigation system 16, an operation controller 18, a warning device 20, sensors/detectors 32 and a vehicle controller 22. The controller 18 is intended to represent all of the separate modules, controllers, processors, electronic control units, etc. that are necessary to perform and run the various algorithms and processes discussed herein. The map database 14 stores map information at any level of detail that is available, including specific information about intersections, such as the number of lanes, lane travel patterns, etc. The map database 14 operates in association with the navigation system 16 to display the various maps and other information that is available, and allow a user to input, plan and display a route. The sensors/detectors 32 are intended to represent any and all object detection sensors or cameras on the vehicle 12, such as forward, rear and side cameras, back-up cameras, lidar sensors, long range radar detectors, short range radar detectors, ultrasonic sensors, etc., located at any position on the vehicle 12. The warning device 20 can be any suitable warning device, such as display icons, haptic seat, chimes, etc. The controller 22 controls the operation of the vehicle 12, including steering, brake, throttle, etc., possibly for both autonomous and semi-autonomous capabilities, and provides any other vehicle control consistent with the discussion herein. The vehicle 12 also includes a wireless port 24 that allows the vehicle 12 to wirelessly transmit messages and receive messages from many sources, such as the Internet 26, satellites 28, wireless infrastructure 30, etc. The wireless port 24 also allows the vehicle 12 to provide V2I and V2V communications, if available.

Figure 2:
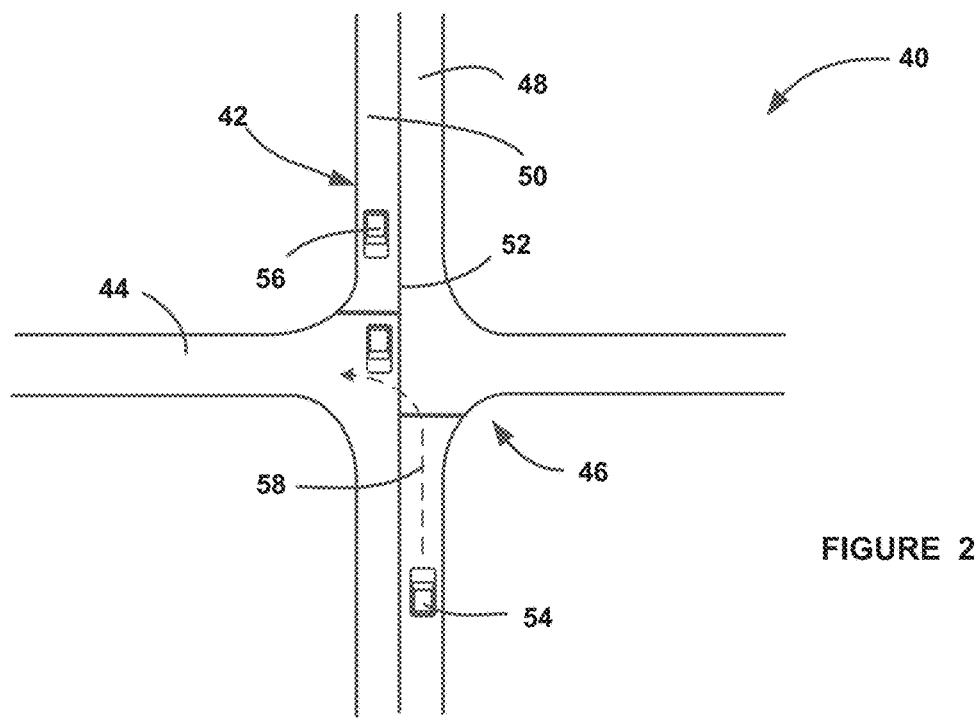
FIG. 2 is an illustration of an intersection showing a host vehicle making a left turn.

FIG. 2 is an illustration 40 showing perpendicular roadways 42 and 44 defining an intersection 46, where the roadway 42 includes opposing traffic lanes 48 and 50 separated by a center lane 52. It is noted that the discussion herein also includes intersections where the roadways are not perpendicular. A host vehicle 54 is traveling in the lane 48 and opposing remote vehicles 56 are traveling in the lane 50, where the host vehicle 54 is turning left into the roadway 44 in front of the remote vehicle 56, which could potentially be a collision risk. The host vehicle 54 may slow down at the intersection 46 when there is a stop sign or a signal even when the host vehicle 54 is going straight through the intersection 46. Not knowing the intent of the host vehicle 54 becomes even more problematic if there is only a single lane for all straight through, left-turning and right-turning vehicles.

Figure 3:
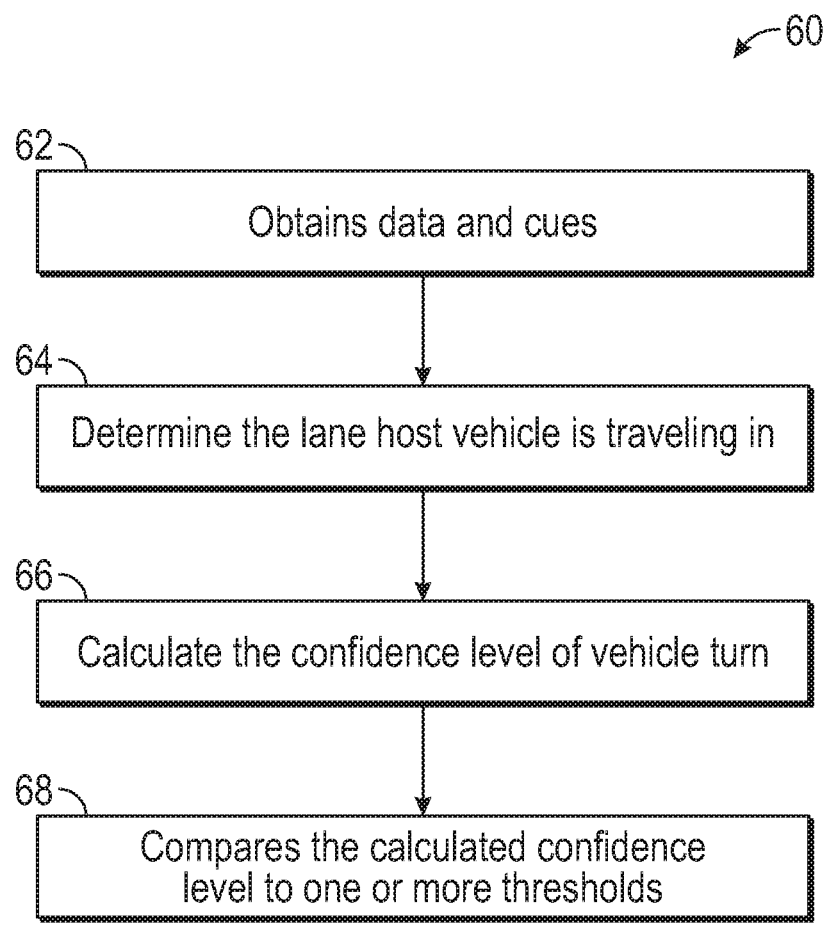
FIG. 3 is a flow chart diagram showing a general overview of a process for determining whether a host vehicle intends to make a left or right turn.

FIG. 3 is a general overview of a process for determining a confidence level that the host vehicle 54 intends to make a turn at some point in time, usually at an identified intersection, and then take some action depending on a collision risk. The algorithm for determining the confidence level is continually running in the vehicle system so that various inputs, such as vehicle location, vehicle travel lane, vehicle speed, road wheel angle, etc., may provide an indication that the host vehicle 54 intends to make a turn, and that confidence level goes up or down based on various factors. At box 62, the algorithm obtains data and cues that it can use to determine the confidence level that the host vehicle 54 intends to make a turn. For example, the data can be obtained from onboard sensors, wireless data received from an infrastructure, such as V2X, Onstar™, internet cloud, etc. the travel lane that the vehicle 54 is in, the speed of the vehicle 54, turn signal activation, whether the vehicle 54 is slowing down, intersection geometry data, congestion of the travel lane, etc. At box 64, the algorithm combines GPS coordinates, map data, position and moving direction of other vehicles, stationary landmarks, and lane markings, etc. to determine the lane that the host vehicle 54 is traveling in. At box 66,the algorithm uses the available information to calculate the confidence level, as will be discussed in detail below, to determine whether the vehicle 54 intends to make a left or right turn. At box 68, the algorithm compares the calculated confidence level to one or more thresholds to determine if certain action needs to be taken, such as informing the driver, providing a warning, providing automatic braking, etc.

Some of the cues available to the algorithm may be more important for determining whether the host vehicle 54 intends to make a turn, such as a left turn signal, than other cues. One of the heavily weighted cues is the travel lane that the host vehicle 54 is currently in, such as whether it is in a left lane or a left turn only lane, where the lane data may or may not be provided by the map database 14, and the previously lane occupied by the host vehicle 54, i.e., whether the host vehicle 54 has recently changed lanes to a turn lane. If the navigation maps include the number of lanes, then that information can be used to determine what lane the host vehicle 54 is in, and whether it is making a lane change or a left or right turn. If the map database does not include the separate travel lanes, then the algorithm can use other available data, such as the position and travel direction of other vehicles in both the opposite direction or the same direction and location of objects, such as curbs, to determine what lane the host vehicle 54 is in. For example, if there are no same direction vehicles on the left of the host vehicle 54 and there are other direction vehicles on the immediate left of the host vehicle 54, then the host vehicle 54 is in the left-most travel lane. Further, the algorithm can employ path history of the host vehicle 54 and road center coordinates provided by the map database 14 to determine the center of the roadway and based on that known location determine whether the host vehicle 54 has made any lateral deviations from the road center to help determine whether the host vehicle 54 intends to make a lane change. Also, the algorithm can employ onboard sensors to identify the relative position of the host vehicle 54 to other vehicles, the location of road signs, identification of road features, such as curves, lane markings, lane colors, etc.

The algorithm may also determine that the host vehicle 54 is in a left turn only or a left turn allowed lane using lane level maps, intersection geometry, and traffic direction details from the maps to determine that the host vehicle 54 intends to make a turn. The algorithm can also employ sensing system inputs to determine that the host vehicle 54 is in a left turn only lane, such as identifying signal light types, i.e., left turn arrows, identify road signs and lane markings indicating traffic directions, and assess the path and location of the remote vehicles 56 in the same lane ahead of the host vehicle 54, lateral deviations of the remote vehicles 56, such as a same direction remote vehicle being on the far left suggest that the host vehicle 54 is less likely to be in a left turn lane, and employ V2V or V2I data to determine the path history and path prediction of the remote vehicles 56 to determine traffic flow and direction.

Figure 4A:
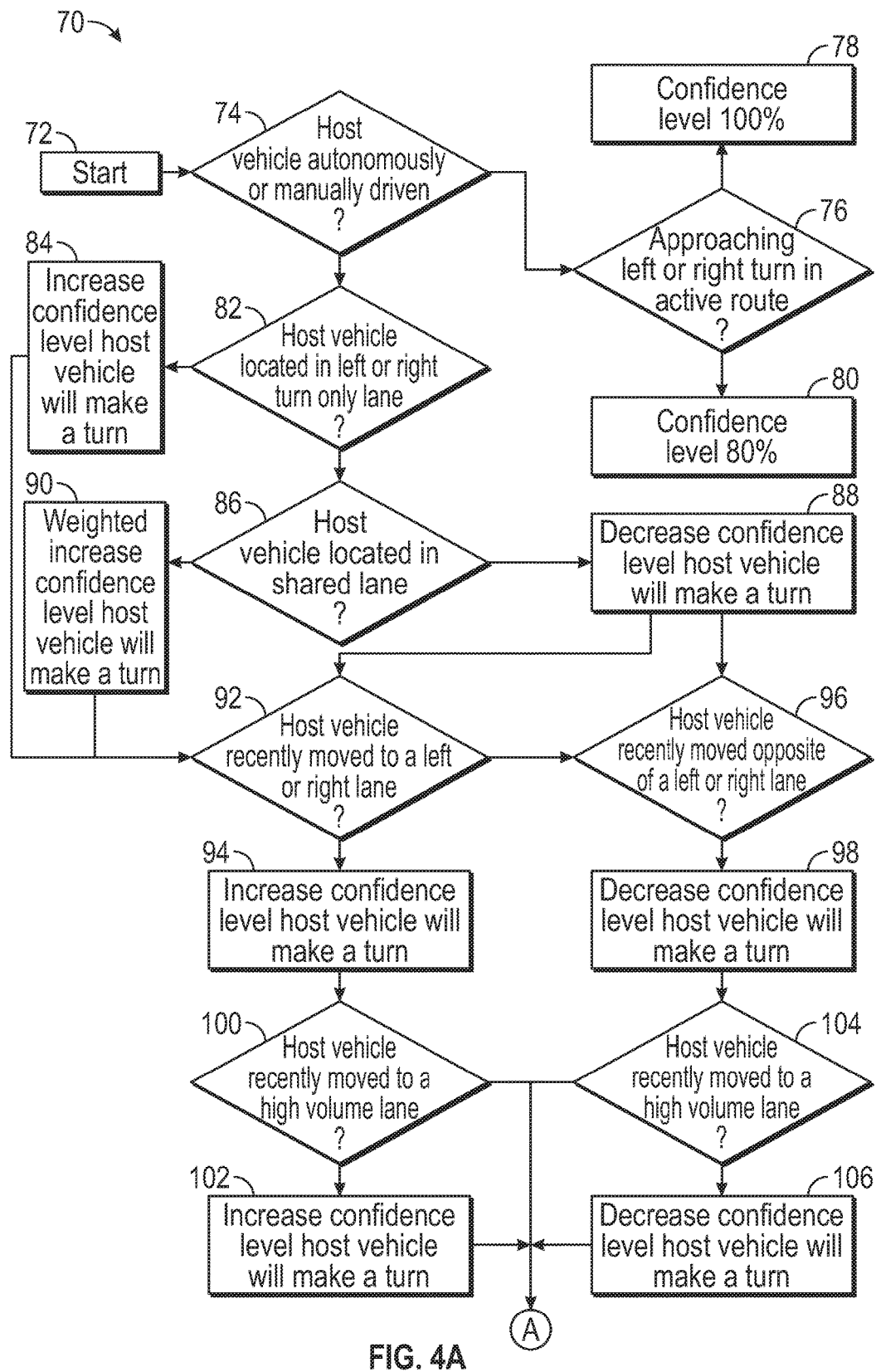
FIGS. 4a and 4b are a flow chart diagram showing a method for combining relevant cues to determine with a certain level of confidence whether a host vehicle intends to make a left or right turn.
Figure 4B:
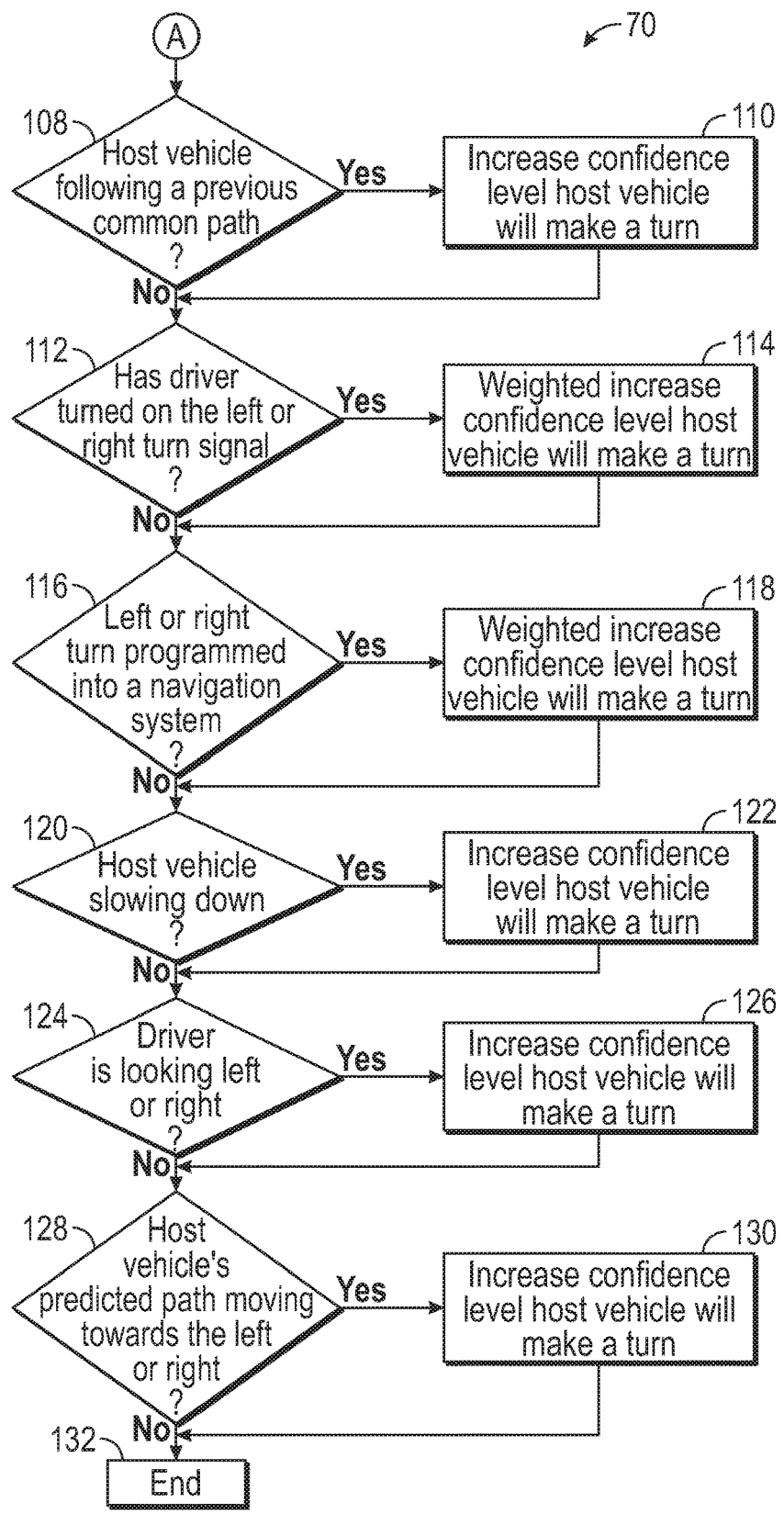

FIGS. 4a and 4b are a flow chart diagram 70 showing a process used by the algorithm discussed herein for combining relevant cues to calculate the confidence level at the box 66 that the host vehicle 54 intends to make a left or right turn at an intersection, or other location, where that confidence level can then be used in other systems on the vehicle 54 to provide driver information, warnings, automatic braking, etc., if necessary, at the box 68. As will be discussed, the process shown in the diagram 70 increases or decreases the confidence level based on available relevant cues, such as vehicle operation, position and velocity of the remote vehicles 56 around the host vehicle 54, vehicle path history, intersection geometry, roadside objects, etc. As the algorithm monitors the various cues and as the host vehicle 54 travels, the confidence level will be continually updated based on those cues.

As will become apparent from the discussion below, the process depicted in the flow chart diagram 70 determines a running confidence level as to whether the driver of the host vehicle 54 intends to make one of a left or right turn in the immediate future. A separate algorithm is also continually running to determine whether the driver of the host vehicle 54 intends to make the other of the left or right turn at the same time. The discussion herein will treat the operation of the diagram 70 as attempting to identify both confidence levels. It is further noted that the process described for the diagram 70 observes several cues to make the calculation of the confidence level of an intent to turn. As each of the cues is assessed in the process, the confidence level that the host vehicle 54 intends to make a turn will go up or down based on the weighted relevance of a cue. However, it is noted that other cues may also be applicable to be helpful and determine driver intent for making a turn, where some of the cues are weighted more heavily than other cues, and the order in which the cues are discussed is not critical to the operation of the algorithm. The weighting factor given to the increase in the confidence level could be adjusted based on many various factors, such as how close the host vehicle may be to approaching an intersection, whether roads are available to turn into, etc.

In one embodiment, the algorithm for calculating the confidence level (CL) includes:

```
CL= CL initial %
for j=1:n {
    if (Dj==Increase CL) {
        CL=min(100%, CL + alpha_j)
    } else
    -if (Dj==Decrease CL) {
        CL=max(0%, CL - beta_j)
    }
},
``` where:

CL initial is the initial CL value, which may be selected based on the exact implementation of the algorithm (example: 0%, 100%, 50% etc), n=number of cues, $D_j$ =Decision based on $j^{th}$ cue, $alpha_j$ and $beta_j$=weight given to $j^{th}$ cue, and where $alpha_j$ and $beta_j$ may be determined empirically, $alpha_j$ and $beta_j$ may be updated based on driver behavior during prior encounters, such as $alpha_j$ for a left turn confidence computation and $beta_j$ for a right turn confidence computation relevant for "left signal on status" can be adjusted based on distance to the intersection, duration of the status, how frequently the driver enables the turn signal during left turns, etc., as well as other environment factors such as the type of intersection. It is noted that other algorithms for determining the confidence level may also be applicable, such as a conditional probability approach using Bayes formula.

The algorithm starts at box 72 and determines whether the host vehicle 54 is being completely autonomously driven or manually driven at decision diamond 74. If the vehicle 54 is being autonomously driven at the decision diamond 74, then the algorithm determines whether a left or right turn is approaching in the active route at decision diamond 76, and if so, the confidence level that the turn will occur is 100% at box 78 and otherwise is 0% at box 80.

If the algorithm determines that the host vehicle 54 is being manually driven at the decision diamond 74, the first cue that the algorithm looks at is whether the host vehicle 54 is in a left turn only or a right turn only lane at decision diamond 82 if that information is available from the map database 14 or is determined using other inputs such as road markings, road signs, for example, "right lane must turn right", signal lights (arrow), etc. If the host vehicle 54 is in a left or right turn only lane, then the algorithm increases the confidence level that the vehicle 54 will be making a turn at box 84 with a high weighting factor. If the vehicle 54 is not in a left or right turn only lane at the decision diamond 82, the algorithm determines whether the lane that the host vehicle 54 is currently traveling in is available for making a left or right turn, i.e., is a shared lane where the host vehicle 54 may keep going straight, may turn left and/or may turn right, at decision diamond 86. If the host vehicle 54 is not in a lane where a turn is possible, i.e., is in a left lane, where a right turn is not possible, then the confidence level that the host vehicle 54 is going to make that turn is decreased at box 88. If the host vehicle 54 is traveling in a lane where a left or right turn is possible at the decision diamond 86, then the confidence level that the host vehicle 54 may be making a left or right turn is increased at box 90, where that increase in the confidence level is weighted in combination with other factors as that travel lane alone is not indication of a turn.

The next cue that the algorithm looks at is whether the host vehicle 54 has recently moved to a left or right lane at decision diamond 92, which would be an indication that the host vehicle 54 is intending to make a left or right turn depending on which direction the host vehicle 54 moved, where if the host vehicle 54 has moved to a left or right lane at the decision diamond 92 the confidence level is increased at box 94 for that left or right turn. Likewise, the algorithm also determines whether the host vehicle 54 has moved into the opposite of the left or right lane at decision diamond 96. If the algorithm is determining the confidence level for whether the host vehicle 54 is intending to make a left turn, then moving to a right lane would be an indication that the vehicle 54 is not intending to make a left turn, where the confidence level is decreased at box 98. Likewise, if the algorithm is determining the confidence level for whether the host vehicle 54 is intending to make a right turn, then moving to a left lane would be an indication that the vehicle 54 is not intending to make a right turn, where confidence level is decreased at the box 98.

The determination of whether to increase or decrease the confidence level based on the host vehicle 54 changing lanes at the decision diamonds 92 and 96 can be further evaluated based on whether the lane that the host vehicle 54 moved into has high volume traffic, where moving from a lane with fewer vehicles to a lane with more vehicles would be an indication that the host vehicle 54 is intending to make a turn. For example, when the host vehicle 54 moves into a left or right lane at the decision diamond 92, and the confidence level is increased at box 94, the algorithm can then determine whether the lane that the vehicle 54 moved into is a high volume lane at decision diamond 100, and if so, further increase the confidence level that the vehicle 54 is intending to make a left or right turn at box 102. Likewise, if the algorithm determines that the vehicle 54 is moving into the opposite lane from the left or right turn being determined, where the confidence level is decreased at the box 98, the algorithm can determine that the lane that the vehicle 54 moved into is a high volume lane at decision diamond 104, and if so, further decrease the confidence level that the host vehicle 54 will be making the other left or right turn at box 106.

If the lane that the vehicle 54 has moved into is not a high volume traffic lane at the decision diamond 100 or 104, the next cue that the algorithm can look at is whether the host vehicle 54 has made frequent left or right turns at the host vehicles current location, i.e., whether the host vehicle 54 is following a previous common path at decision diamond 108, such as traveling between work and home. If the host vehicle 54 has made frequent turns at a particular location, such as a certain intersection, then the algorithm increases the confidence level that the vehicle 54 is intending to make that turn again at box 110. When active navigation guidance exists, the algorithm increases the confidence level using navigation output cues with a high weighting factor in similar situations. If the host vehicle 54 has not made frequent turns at the current location at the decision diamond 108, then the algorithm moves to the next cue for determining the confidence level at decision diamond 112, which includes determining whether the driver has turned on the left or right turn signal. If the driver has turned on the left or right turn signal at the decision diamond 112, then the confidence level that the host vehicle 54 is intending to make the turn is increased at box 114 based on an appropriate weighting factor, otherwise the algorithm moves to the next cue at decision diamond 116 that determines whether there is a left or right turn programmed into the navigation system 16. The weighting factor may be adjusted by, for example, duration of a traffic signal, driver's previous behavior, whether the host vehicle 54 is near an intersection, distance from the intersection, type of intersection, etc.

If there is a left or right turn programmed into the navigation system 16 at the decision diamond 116, then the confidence level that a turn will occur is increased at box 118 with a high weighting factor, otherwise the algorithm moves to the next cue at decision diamond 120 that determines whether the host vehicle 54 is intentionally slowing down when it could do otherwise. If the determination is made that the host vehicle 54 is slowing down at the decision diamond 120, then the confidence level that the host vehicle 54 is intending to make a turn is increased at box 122, otherwise the algorithm moves to the next cue that includes determining the driver's attention direction at decision diamond 124. For example, cameras inside of the host vehicle 54 may be able to determine whether the driver is looking left or right, which is an indication that the driver may be turning left or right, or paying more attention to opposite direction traffic, which is an indication that the driver may be turning left, where the confidence level of a turn is increased at box 126. If the algorithm does not identify a cue from the driver attention at the decision diamond 124, then the algorithm moves on to the next cue at decision diamond 128 that determines whether the host vehicle's predicted path is moving towards the left or right at, for example, an intersection. If the host vehicle's predicted path is moving towards the left or right side at the decision diamond 128, then the algorithm increases the confidence level of an intended turn at 130, where the algorithm ends at box 132.

It is noted that the algorithm discussed herein for assessing cues to determine host vehicle turning intent is adaptable in that the weighting factor given to certain of the cues can be increased or decreased based on driving history and other factors. Further, it is noted that the order in which the cues are assessed as discussed herein is one non-limiting example in that other assessment orders may be equally applicable.

Although the algorithm discussed herein for determining intent to turn has specific application for turning at known intersections available from the map database 14, the algorithm also has application for determining driver intent to turn left or right at unknown intersections, such as driveways, that are not typically available in a map database, or through V2I communications, which limits the ability to identify their precise locations. Since this evidence is typically not available for turning at these locations, other cues become more important, such as moving into a center turn lane, slowing down in the absence of a remote vehicle ahead of the host vehicle 54, etc. It is further noted that the algorithm discussed herein is adaptable to handle different types of intersections, such as those having traffic signals, stop signs and uncontrolled intersections. For example, if the host vehicle 54 is slowing down when approaching an uncontrolled intersection, it is a strong cue that the driver intends to make a turn. However, for signal or stop-sign intersections such a cue is not a strong indication. These additional details may be incorporated into the algorithm by modifying the weighting factors associated with the relevant cue.

Another determination of driver turning intention is to differentiate between whether the host vehicle 54 is yielding to a remote vehicle traveling in an opposite direction or cutting across the remote vehicle's path while executing a left turn. This determination is important because the warning or control actions may be different. For example, the algorithm may provide an alert if the driver's intention is to yield to oncoming remote vehicles, but issue a warning and/or take automatic control actions if the host vehicle 54 is attempting to cut across a path of an oncoming remote vehicle. Various cues can be employed in this situation including the velocity and acceleration of the host vehicle 54, the road wheel angle and yaw rate of the host vehicle 54, the projected speed profile of the host vehicle 54 and the host vehicles location.

Figure 5:
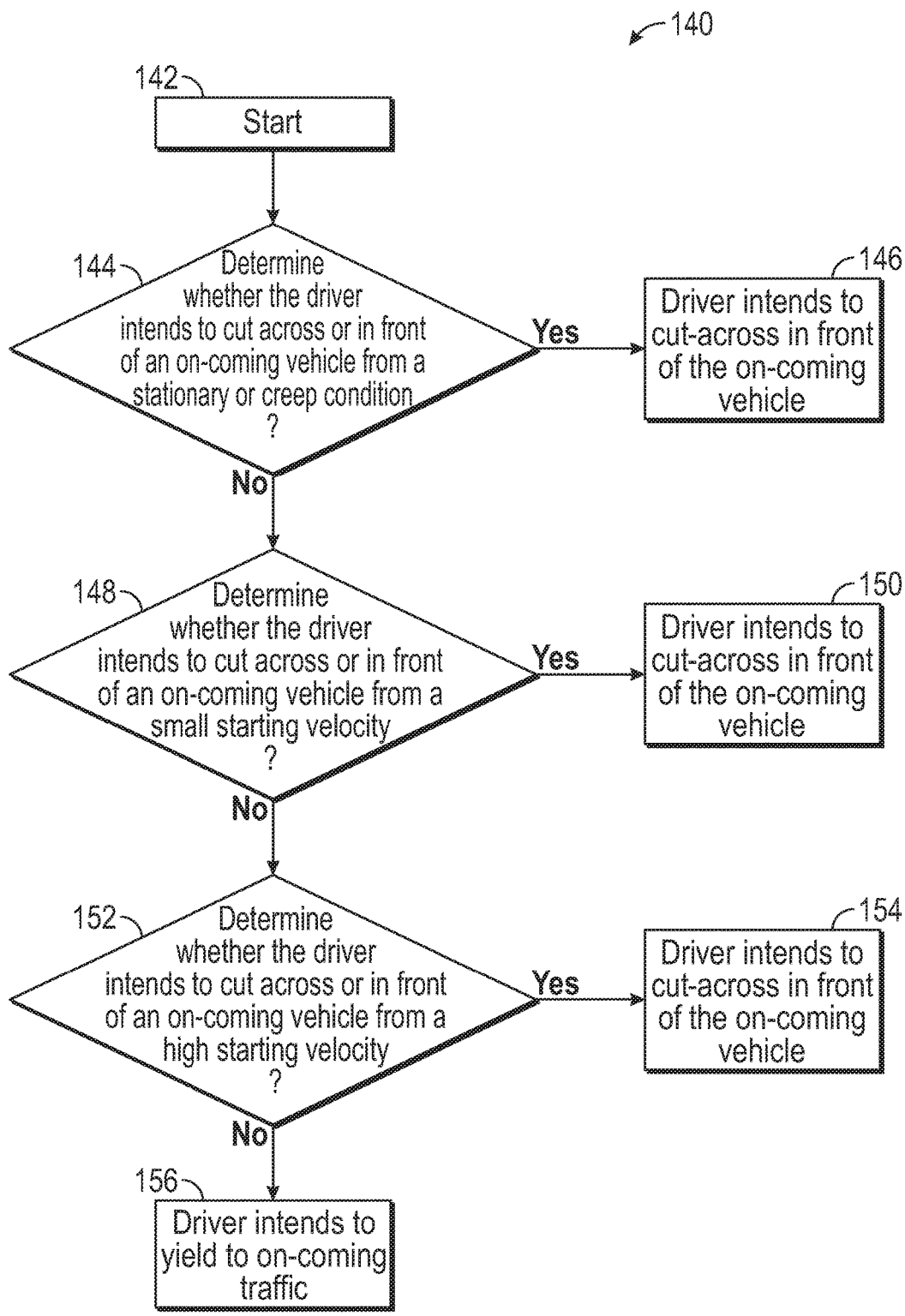
FIG. 5 is a flow chart diagram showing a process for determining whether a host vehicle intends to yield to or cut-across in front of an oncoming vehicle when making a left turn.

A separate algorithm can be employed for determining whether the driver intention is to cut across in front of an oncoming vehicle or yield to the vehicle when making a left turn. FIG. 5 is a flow chart diagram 140 showing process steps for one such type algorithm. The algorithm starts at box 142 and then determines whether the driver intends to cut across in front of an on-coming vehicle from a stationary or creep condition at decision diamond 144 by determining that the velocity of the host vehicle 54 is below a predetermined low velocity V1, the road wheel angle (RWA) of the host vehicle 54 is greater than a predetermined road wheel angle RWA1, which is a significant large road wheel angle, and whether the brake pedal of the host vehicle 54 has been released. If all three of these conditions are met, then the algorithm determines that the driver is intending to cut-across in front of the on-coming vehicle at box 146.

If the algorithm determines that the driver is not intending to cut across in front of an oncoming vehicle from a stationary or creep condition at the decision diamond 144, then the algorithm proceeds to decision diamond 148 to determine whether the driver is intending to cut-across in front of an on-coming vehicle starting from a small relative velocity, which it greater than the velocity V1. In this decision, the algorithm determines that the velocity of the host vehicle 54 is greater than a velocity V2, which is greater than the velocity V1, that the RWA is greater than a predetermined RWA2, which is less than RWA1, and the host vehicle 54 is accelerating at a value greater than a predetermined acceleration A1. If all three of these conditions are met, then the algorithm determines that the vehicle driver is intending to cut-across in front of an on-coming vehicle starting from a relatively small velocity at box 150.

If the algorithm determines that the vehicle driver is not intending to cut-across in front of an on-coming vehicle from a small starting velocity at the decision diamond 148, the algorithm then determines whether the driver is intending to cut-across in front of an on-coming vehicle at a relatively high velocity at decision diamond 152. In this decision, the algorithm determines whether the RWA is greater than a predetermined road wheel angle RWA3 that is less than both RWA1 and RWA2, whether there is a large projected vehicle velocity greater than velocity V3, which is greater than V1 and V2 and a small deceleration of the host vehicle 54 less than a predetermined deceleration D1. If all of these three conditions are met, then the algorithm determines that the host vehicle 54 is intending to cut-across in front of an on-coming vehicle at a high velocity at box 154.

If none of the conditions have been met at the decision diamonds 144, 148 and 152, then the algorithm determines that the host vehicle 54 is intending to yield to on-coming traffic at box 156. The threshold values V1, V2, V3, RWA1, RWA2, RWA 3, A1 and D1 can be determined empirically, and different threshold values can be adapted for different driving configurations, such as aggressive, normal and conservative.

An adaptation process can be employed for specific drivers where the thresholds for providing warnings or alerts can be increased or decreased based on previous confidence level calculations. For example, if the confidence level is above the threshold that the driver is making a turn, but does not make the turn, that threshold can be increased. Table 1 below illustrates one example for increasing or decreasing the threshold based on adapting the confidence level.

TABLE 1

|  | CL >=Threshold | CL <Threshold |
| --- | --- | --- |
| Left/Right Turn | A | B |
| No Left/Right Turn | C | D |

T = A + B + C + D: Total number of previous CL computations
$P_{FA}$ (Probability of false alarms) = C/T
$P_{miss}$ (Probability of miss) = B/T
Threshold may be determined to limit the value of $P_{FA}$ or $P_{miss}$ As will be well understood by those skilled in the art, the several and various steps and processes discussed herein to describe the invention may be referring to operations performed by a computer, a processor or other electronic calculating device that manipulate and/or transform data using electrical phenomenon. Those computers and electronic devices may employ various volatile and/or non-volatile memories including non-transitory computer-readable medium with an executable program stored thereon including various code or executable instructions able to be performed by the computer or processor, where the memory and/or computer-readable medium may include all forms and types of memory and other computer-readable media.

The foregoing discussion discloses and describes merely exemplary embodiments of the present invention. One skilled in the art will readily recognize from such discussion and from the accompanying drawings and claims that various changes, modifications and variations can be made therein without departing from the spirit and scope of the invention as defined in the following claims.

What is claimed is:

1. A method for determining whether a driver of a host vehicle intends to make a turn, said method comprising:
    obtaining, by a processor, a plurality of turning cues that identify external parameters around the host vehicle and/or define operating conditions of the host vehicle, wherein obtaining turning cues includes determining that a distance to a remote vehicle ahead of the host vehicle is increasing;
    determining, by the processor, a confidence level that the host vehicle intends to make a left or right turn based on the turning cues where determining the confidence level includes weighting each of the cues based on current driving operating conditions and determining the confidence level that the host vehicle intends to make a turn includes increasing the confidence level of a left or right turn if the distance is increasing;
    comparing, by the processor, the confidence level to a threshold; and
    providing a warning, via a warning device, to a vehicle and/or performing a vehicle control action, via a controller, on the vehicle in response to the confidence level exceeding the threshold.

2. The method according to claim 1 wherein obtaining a plurality of turning cues includes determining whether the host vehicle is in a left or right turn only lane or a no left or right turn lane, and wherein determining a confidence level that the host vehicle intends to make a turn includes increasing the confidence level that the host vehicle intends to make a turn if the vehicle is in a left or right turn only lane and decreasing the confidence level if the host vehicle is in a no left or right turn lane.

3. The method according to claim 1 wherein obtaining a plurality of turning cues includes determining whether the host vehicle moved to a different lane, and wherein determining a confidence level that the host vehicle intends to make a turn includes increasing the confidence level that the vehicle intends to make a left turn if the host vehicle moved to a left lane and increasing the confidence level that the vehicle is making a right turn if the host vehicle moved to a right lane.

4. The method according to claim 3 wherein obtaining turning cues includes determining whether the host vehicle moved into a high volume lane, and wherein determining a confidence level that the host vehicle intends to make a turn includes increasing the confidence level that the vehicle intends to make a left turn if the vehicle moves into a left lane having high traffic volume and increasing the confidence level that the vehicle intends to make a right turn if the host vehicle moved into a high traffic volume right lane.

5. The method according to claim 1 wherein obtaining turning cues includes determining whether the host vehicle has made previous left or right turns at a particular location, and wherein determining a confidence level that the host vehicle intends to make a turn includes increasing the confidence level that the host vehicle intends to make a left or right turn if the vehicle has made previous left or right turns at that location.

6. The method according to claim 1 wherein obtaining turning cues includes determining whether the driver has turned on a left or right turn signal, and wherein determining the confidence level that the host vehicle intends to make a turn includes increasing the confidence level of a left turn if the left turn signal is on and increasing the confidence level of a right turn if the right turn signal is on.

7. The method according to claim 1 wherein obtaining turning cues includes determining that a programmed route in a navigation system indicates a turn, and wherein determining the confidence level that the host vehicle intends to make a turn includes increasing the confidence level if a programmed turn is in the navigation system.

8. The method according to claim 1 wherein obtaining turning cues includes determining that the driver of the host vehicles attention is turned to the left or right, and wherein determining the confidence level that the host vehicle intends to make a turn includes increasing the confidence level if the vehicle driver attention is to the left or right.

9. The method according to claim 1 wherein determining the confidence level that the host vehicle intends to make a turn includes adapting the determination of the confidence level based on a driver's previous behavior.

10. The method according to claim 1 wherein obtaining a plurality of turning cues includes obtaining information and data from one or more of vehicle velocity, vehicle position, a map database, long range sensors on the vehicle, short range sensors on the vehicle, cameras on the vehicle, lidar sensors on the vehicle, V2X communications, host vehicle path history, Internet communications and satellite communications.

11. The method according to claim 1 wherein weighting the cues includes adjusting the weighting by one or more of duration of a traffic signal, driver's previous behavior, whether the host vehicle is near the intersection, distance from the intersection and type of intersection.

12. The method according to claim 1 further comprising determining whether the driver of the host vehicle intends to yield to oncoming traffic or cut-across in front of oncoming traffic when making a left turn.

13. The method according to claim 12 wherein determining whether the driver intends to cut-across in front of on-coming traffic includes determining whether the host vehicle intends to cut-across the on-coming from a stationary or creep condition if the host vehicle velocity is less than a first predetermined velocity, a road wheel angle of the host vehicle is greater than a first predetermined road wheel angle, and a vehicle brake pedal is not pressed.

14. The method according to claim 13 wherein determining whether the driver intends to cut-across in front of on-coming traffic includes determining that the host vehicle intends to cut-across in front of the on-coming traffic from a starting small velocity if the host vehicle velocity is less than a second predetermined velocity that is less than the first predetermined velocity, the road wheel angle of the host vehicle is greater than a second predetermined road wheel angle that is less than the first predetermined road wheel angle, and an acceleration of the host vehicle is greater than a predetermined acceleration.

15. The method according to claim 14 wherein determining whether the driver intends to cut-across in front of on-coming traffic includes determining that the driver of the host vehicle intends to cut-across in front of on-coming traffic from a high velocity if the road wheel angle of the host vehicle is greater than a third predetermined road wheel angle that is less than the second predetermined road wheel angle, a projected host vehicle speed is greater than a third predetermined velocity that is greater than the second predetermined velocity and the host vehicle is decelerating less than a predetermined deceleration.

16. A method for determining whether a driver of a host vehicle intends to make a turn, said method comprising:
obtaining a plurality of turning cues that identify external parameters around the host vehicle and/or define operation of the host vehicle; and
determining a confidence level that the host vehicle intends to make a left or right turn based on the turning cues, wherein determining the confidence level includes determining whether the driver of the host vehicle intends to yield to on-coming traffic or cut-across in front of on-coming traffic when making a left turn, wherein determining whether the driver intends to cut-across in front of on-coming traffic includes determining whether the host vehicle intends to cut-across from a stationary or creep condition if the host vehicle velocity is less than a first predetermined velocity, a road wheel angle of the host vehicle is greater than a first predetermined road wheel angle, and a vehicle brake pedal is not pressed;
comparing, by the processor, the confidence level to a threshold; and
providing a warning, via a warning device, to a vehicle and/or performing a vehicle control action, via a controller, on the vehicle in response to the confidence level exceeding the threshold.

17. The method according to claim 16 wherein determining whether the driver intends to cut-across in front of on-coming traffic includes determining that the host vehicle intends to cut-across in front of the oncoming traffic from a starting small velocity if the host vehicle velocity is less than a second predetermined velocity that is less than the first predetermined velocity, the road wheel angle of the host vehicle is greater than a second predetermined road wheel angle that is less than the first predetermined road wheel angle, and an acceleration of the host vehicle is greater than a predetermined acceleration.

18. The method according to claim 17 wherein determining whether the driver intends to cut-across in front of on-coming traffic includes determining that the driver of the host vehicle intends to cut-across in front of oncoming traffic from a high velocity if the road wheel angle of the host vehicle is greater than a third predetermined road wheel angle that is less than the second predetermined road wheel angle, a projected host vehicle speed is greater than a third predetermined velocity that is greater than the second predetermined velocity and the host vehicle is decelerating less than a predetermined deceleration.

\* \* \* \* \*